Feb. 14, 1961   P. E. ENNEPER   2,971,736
SUPPORT SYSTEM FOR LARGE AREA BODIES
Filed Oct. 15, 1959   8 Sheets-Sheet 2

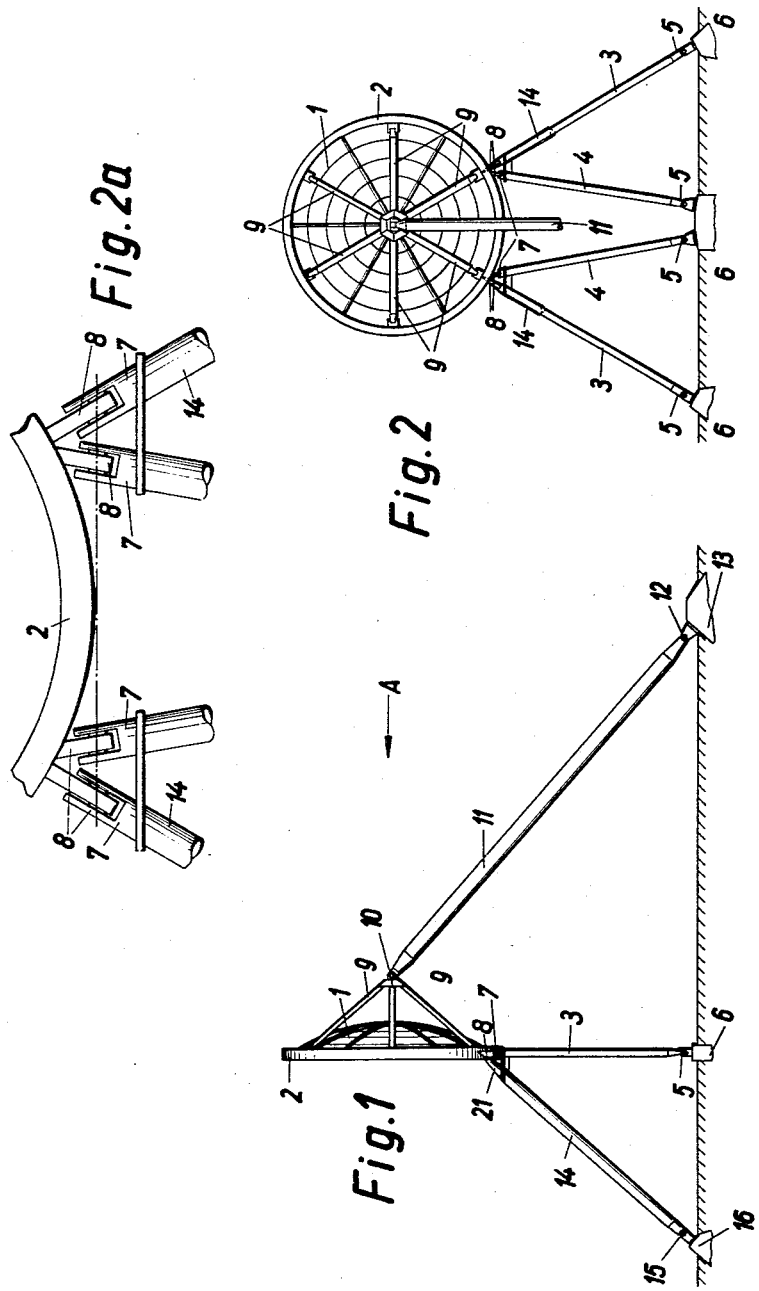

Inventor:
Paul Ernst Enneper
By
Patent Agent

Feb. 14, 1961 P. E. ENNEPER 2,971,736
SUPPORT SYSTEM FOR LARGE AREA BODIES
Filed Oct. 15, 1959 8 Sheets-Sheet 3

Inventor:
Paul Ernst Enneper
By
Patent Agent

Feb. 14, 1961   P. E. ENNEPER   2,971,736
SUPPORT SYSTEM FOR LARGE AREA BODIES
Filed Oct. 15, 1959   8 Sheets-Sheet 4

Inventor:
Paul Ernst Enneper
By
Patent Agent.

Feb. 14, 1961 P. E. ENNEPER 2,971,736
SUPPORT SYSTEM FOR LARGE AREA BODIES
Filed Oct. 15, 1959 8 Sheets-Sheet 5

Inventor:
Paul Ernst Enneper
By
Patent Agent

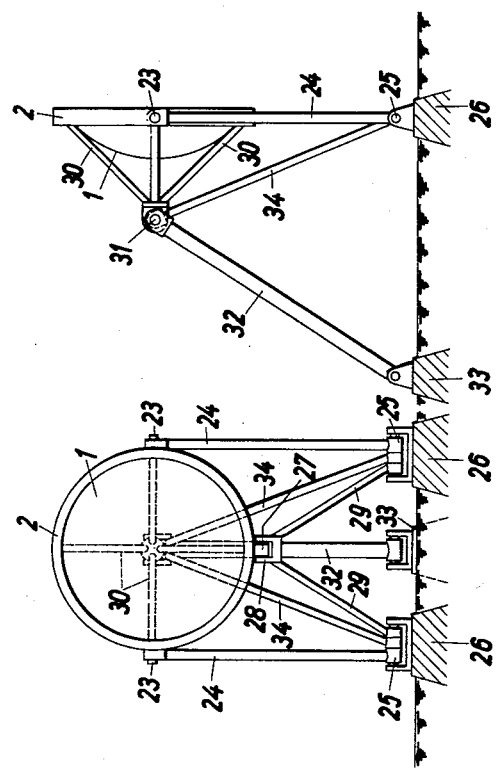

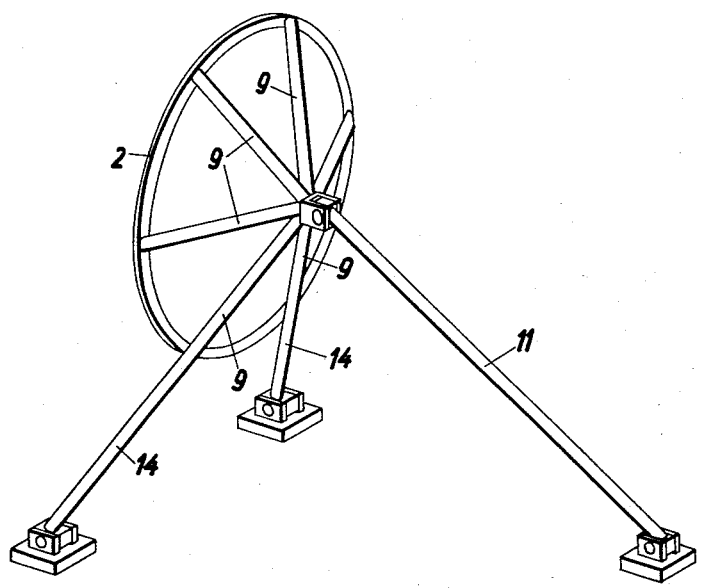

United States Patent Office 2,971,736
Patented Feb. 14, 1961

2,971,736
SUPPORT SYSTEM FOR LARGE AREA BODIES

Paul Ernst Enneper, Rheinhausen, Lower Rhine, Germany, assignor to Beteiligungs- und Patentverwaltungsgesellschaft mit beschränkter Haftung, Essen, Germany Filed Oct. 15, 1959, Ser. No. 846,684

Claims priority, application Germany Oct. 18, 1958

24 Claims. (Cl. 248—163)

The present invention relates to a supporting structure for a large area body with an endless support connected thereto, for instance for a bowl of revolution with annular-shaped support. Such bowls of revolution may comprise for instance reflectors of large diameter as for instance a diameter of 20 yards, while the endless supports for absorbing the wind load as well as the load due to its own weight and the formation of ice generally are formed by rings which are resistant to pressure, pulling and bending stresses. With heretofore known reflectors of the type involved having stationary fixed axes with a more or less great distance from the ground, the said rings are usually supported by a number of struts some of which are inclined and some of which are arranged in the plane of the ring. All of said struts individually extend from the reflector to the ground and may be braced relative to each other in the manner of a truss or lattice work. An arrangement of this type results in a highly unsymmetrical load on the rings and furthermore requires considerable material as well as a rather awkward assembly.

It is, therefore, an object of the present invention to provide an arrangement of the above mentioned type which will overcome the above outline drawbacks.

It is another object of this invention to provide a supporting structure for a large area body with an endless support connected thereto, which will make it possible by means as light as possible safely to absorb the forces acting upon the large area body, especially the wind forces, while subjecting the endless support to favorable stresses.

It is also an object of this invention to provide an arrangement of the type set forth in the preceding paragraphs, which will allow a fast installation without expensive auxiliary means.

These and other objects and advantages of the invention will appear more clearly from the following specification in connection with the accompanying drawings, in which:

Fig. 1 illustrates a reflector with a support shown in side view.

Fig. 2 shows a view seen in the direction of the arrow A of Fig. 1.

Fig. 2a illustrates on a somewhat larger scale the joint connection between supporting elements and a supporting ring for the large area body.

Figure 9:
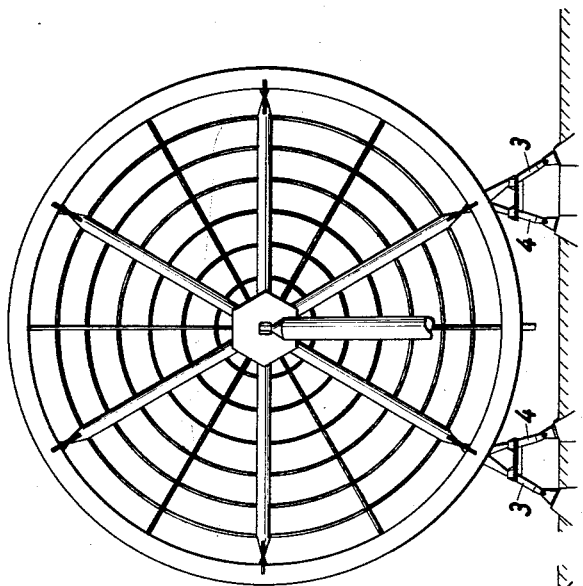
Figure 8:
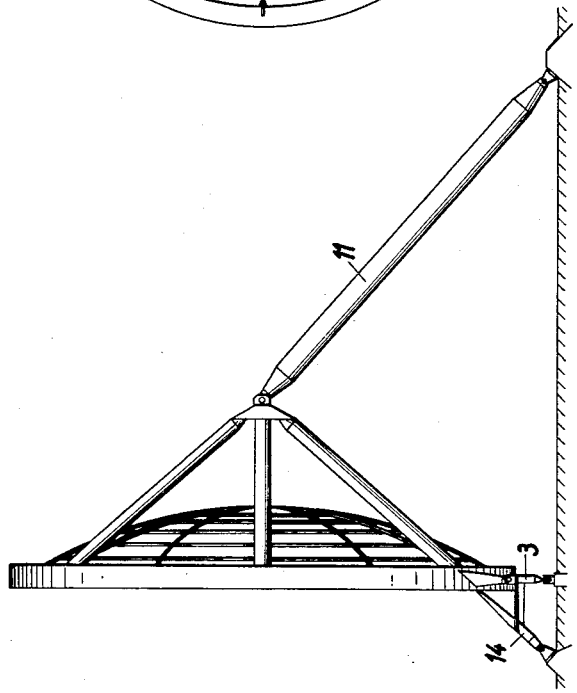

Figs. 8 and 9 respectively show in side view and front view a reflector with a modified support.

Figure 10:
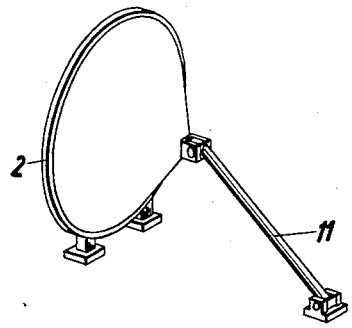
Figure 11:
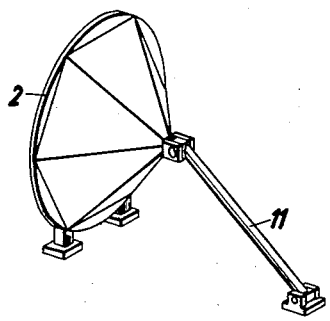

Figs. 10 and 11 represent reflectors with still further modified supports.

Fig. 12 is a front view of an aerial reflector and of a supporting structure with tangential supporting elements.

Fig. 13 illustrates a side view of the arrangement of Fig. 12.

Figs. 14 to 20 illustrate various positions during the installation of a reflector with tangential supporting elements.

Fig. 21 illustrates a modified and simplified supporting structure according to the present invention.

General arrangement

Figure 5:
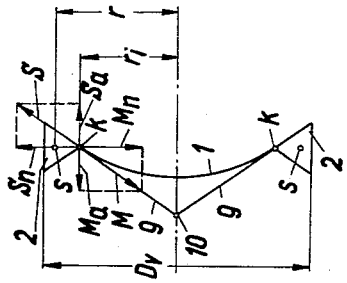
Figs. 3, 4 and 5 represent diagrammatic meridian sections through a reflector for various embodiments of the marginal ring and various arrangements of the supporting elements.
Figure 4:
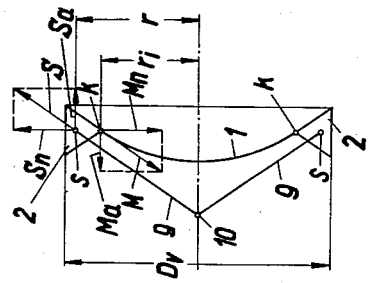

The present invention is characterized primarily by an arrangement according to which the endless support together with pressure and pull-resistant supporting elements converging at a nodal point form a supporting structure, while the nodal point is located within the maximum projection of the large area body, the distance of the nodal point from said body being less than the maximum dimension thereof. Furthermore, in conformity with the invention, the endless support is journalled at at least three supporting points one of which is formed by said nodal point. In many instances, the endless support is formed by a marginal ring connected to the circumference of said large area body. However, other locations of the endless support on said body will be possible. For instance, the said large area body may protrude beyond the support by distances varying in different directions. In a border-line case, the support may form a central supporting body. The supporting elements may be designed as struts preferably uniformly distributed over the said support, or they may be combined to a single bowl having the shape of a cone or a pyramid. If the large area body has a bowl-shaped design, the supporting elements, at least within the range of their respective points of connection with said support, are advantageously located at least approximately along the tangent to the body within said range. It may happen that the bearing forces of the large area body, which are primarily due to wind forces, act along a line which is eccentrically located with regard to the "connecting line of the shear centers" of the support. In this connection, it should be noted that the shear center of a cross section of a beam, strut or the like is that point in which the resultant transverse force acting in the respective cross section upon said beam or strut will be conveyed to the adjacent cross section of the beam or strut. Expressed differently, it may be visualized that the annular support 2 is sliced by radial sections into infinitely thin discs, and that the resultant transverse force acting upon one of these discs will be conveyed to the adjacent disc in the so-called shear center. The connecting line of the shear centers of all of said cross sections of the beam is designated in Figs. 3 to 5 with the letter s. If the cross section of the beam or strut is symmetrical, for instance is that of an equilateral triangle as shown in Figs. 4 and 5, the shear center coincides with the center of gravity of said cross section. If, however, the cross section of the beam or strut is unsymmetrical, for instance forms a U-shaped cross section, the shear center and the center of gravity will not coincide.

If the bearing forces of the large area body act along a line which is eccentrically located with regard to the connecting line of the shear centers of the support, it is advantageous to have the supporting forces of the supporting elements act eccentrically with regard to said connecting line in such a way that the torques exerted by these forces upon the support will balance each other as far as possible.

The supporting structure according to the invention is, in addition to bowls of revolution, also suitable for any other large area bodies. This includes bodies which do not form a diaphragm-like closed surface but a spar assembly supported by a ring, for instance a marginal ring, and composed of spars and rings in the manner of Schwedler cupolas or bending elements, for instance circular plates, beam grids or the like.

Within the concept of the present invention, the supporting points of the large area body, especially the nodal points of the supporting structure, may be so arranged that the large area body will be adjustable. This applies, above all, to reflectors having their axes adjustable in vertical direction and also in lateral direction. A particularly favorable load distribution in the endless support and a corresponding saving in weight will be obtained by causing the vertical forces acting in the plane of the endless support and the torques produced by these forces to act through the intervention of two vertical tangential supporting elements upon two diametrically oppositely located points of the endless support. The above mentioned vertical forces acting in the plane of the endless support are due to the weight of said large area body itself and possibly, in addition thereto, to the ice formed on said large area body and said support. The forces acting in horizontal direction within the plane of the endless support are preferably absorbed by a bearing arranged at the circumference of the endless support. If the endless support is designed as marginal ring, the said last mentioned bearing is preferably arranged at the lower side of the marginal ring in the vertical meridian plane of the bowl.

*Structural arrangement*

The reflector 1 which may consist of a closed area or of a fine mesh screen or lattice work is along its entire circumference enclosed or framed by a marginal ring 2 serving as support. The reflector 1 is mounted along a vertical annular plane, i.e. along a horizontal axis.

The marginal ring 2 rests on two pairs of supporting members 3, 4 which are aligned along said vertical annular plane and which rest on joints 5 carried by foundations 6. The two outer supporting members 3 are arranged symmetrically with regard to the vertical central plane of the reflector 1 in such a way that the extensions of their axes intersect on the reflector axis. If the height of the reflector is to be changed and, accordingly, the supporting members 3, 4 have to be extended or shortened, these supporting members will, independently of the supporting structure like all other supporting elements, maintain their directions. If desired, the inner supporting members 4 may intersect in a common lower end point. The supporting members 4 are inclined in such a way that their axes respectively intersect with the axes of the supporting members 3 on the connecting line of the shearing centers of the marginal ring 2. Below these intersecting points, there are arranged joints 7 with a common axis in which joints the marginal ring 2 is supported by means of extensions 8.

Struts 9 uniformly distributed over the circumference of the marginal ring 2 are connected to the rear of said ring 2. The struts 9 are arranged along a mantle of an imaginary cone having its axis coincide with the axis of the reflector. The tip 10 (Fig. 1) of said cone represents the nodal point to which an appropriate supporting member 11 is linked. The said member 11 is journalled in a joint on the foundation 13, while the center line of the supporting member 11 is located in the vertical plane of symmetry of the reflector or mirror 1. The supporting member 11 together with two of the struts 9 and two supporting members 14 arranged along the extensions of said struts form a tripod. The axes of each supporting member 3 and a supporting member 14 are located in a plane which intersects with the corresponding plane of the two other supporting members 3 and 14 along the reflector axis. The supporting members 14 are supported by joints 15 on foundations 16. The forces acting upon the bowl-shaped reflector are absorbed in the following manner:

The own weight of the reflector 1 and of the marginal ring 2 together with the supporting elements connected thereto and other possible vertical loads caused for instance by the formation of ice, are absorbed by the supporting elements 3 and 4 as far as the loads act in the central plane of the marginal ring 2. The resultant of these loads as far as it is located outside said annular plane, is balanced by the tripod formed by the supporting members 11, 9 and 14.

The lateral forces acting along the annular plane are primarily conveyed to the ground through the intervention of the outer supporting members 3. This is due to the fact that the axes of these supporting elements intersect along the reflector axis. The inner supporting members 4 will be subjected to stress by the lateral forces only when the resultants thereof do not pass through the reflector axis. That portion of the lateral forces which is located outside the annular plane, is absorbed in the nodal point 10 and by means of struts 14 and struts 9 located along the extension of said struts 14 will be conveyed to the foundations.

Those forces which act perpendicular to the plane of the marginal ring 2 upon the reflector or bowl 1, are conveyed by the bowl to the marginal ring 2 and are by the latter conveyed to the nodal point 10 through struts 9 where they are absorbed by the tripod 11, 9, 14. As will be evident from Fig. 3, the bowl 1 is adapted to act upon the marginal ring 2 in such a way that the tangent placed in a meridian section along the circumference of the bowl passes through the connecting line $s$ of the shear centers of ring 2. Accordingly, also the meridian forces M acting upon ring 2 and due primarily to the wind forces acting upon the reflector in a direction perpendicular to the annular plane pass through line $s$, and so do the supporting forces of struts 9. In this connection, the ring 2 will be subjected to stress by normal forces, and in its plane as well as perpendicular thereto by periodically occurring bending torques. This stress, however, can be absorbed relatively favorably because the forces M and S pass through the connecting line $s$.

Figure 3:
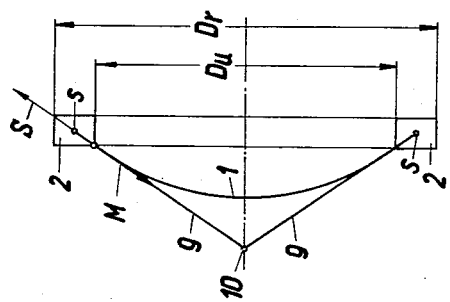

However, this can generally be materialized only if ring 2, as shown in Fig. 3, is located in front of the marginal plane of bowl 1 and if its inner diameter $Du$ equals the outer diameter of the bowl. This arrangement, however, has the drawback that the end faces of ring 2 will cause an additional wind load. Moreover, it has to be taken into consideration that the ring protruding with regard to the mirror or reflector reduces the reflector output. This has to be compensated for in certain circumstances by increasing the diameter of the mirror. However, such an enlargement will call for a further increase of the surface exposed to the wind.

In order to avoid this drawback, in conformity with Figs. 4 and 5, the marginal ring 2 may be arranged on the back side of the bowl 1 so that said ring will not protrude beyond the reflector. The outer diameter $Dv$ may then equal the outer diameter of the bowl 1. Furthermore, this diameter may be less than the diameter $Du$ in conformity with the arrangement of Fig. 3 because the output of the reflector according to Figs. 4 and 5 will not be reduced any longer by a protruding marginal ring. The marginal ring 2 preferably has a triangular cross section in adaptation to the back side of the rim of bowl 1 and forms a hollow body closed all the way around.

If, however, according to Fig. 4 the lines of action of the supporting forces of struts 9 pass through the connecting line $s$ of the shear centers, a tilting torque is exerted upon the marginal ring 2. Based on the consideration that the meridian forces M act upon the inner edge $k$ of the marginal ring 2, it will be evident that the vertical components $Mn$ of the meridian forces will be located in the central plane of ring 2 in which also the connecting line $s$ is located. The components $Ma$, $Sa$ acting perpendicular to the ring plane and respectively pertaining to the meridian forces M and supporting forces S are offset relative to each other by the distance between the edge k and the connecting line s so that the forces Ma will produce a torque tending to turn over the marginal ring 2. This turning-over torque cannot be absorbed by a torsion stress because the reactions are lacking to this extent. They are rather balanced by ring stresses which result in a constant bending torque of the magnitude $B = D \times r$ acting perpendicular to the ring plane, D designating the constant tilting torque with regard to the longitudinal unit along the line s, and r designating the radius of said line. The bending torques may reach a considerable magnitude if the ring radius is great. Therefore, they require great dimensions and weights of the marginal ring.

In order to avoid this drawback, according to Fig. 5 the supporting forces are caused to act likewise eccentrically upon the inner edge k of the marginal ring so that these supporting forces similar to the meridian forces will not pass through line s. In this way, on one hand the bending moment is reduced which is exerted by the components Ma between the connecting points of struts 9 with the marginal ring 2 to such an extent as the radius ri of edge k is less than the radius r of the connecting line s of the shearing centers. Furthermore, the eccentricity moments of the meridian force components Ma are balanced by corresponding moments of the supporting force components Sa. The additional bending moment acting perpendicular to the ring plane and resulting from the turning-over components will be eliminated and there will now result merely an increase in the torsion moments which, however, due to the high torsion resistance of ring 2 can easily be absorbed and require a slight increase in the main stress conditions but no increase in the cross section.

Instead of being formed by struts 9, the supporting elements may also be formed by a cone-shaped bowl which preferably tangentially contacts the circumference of the bowl 1 (Fig. 10). In this particular instance, the meridian forces of the bowl 1 which result from the outer loads acting perpendicularly with regard to the ring plane, will be absorbed directly by the meridian forces of said supporting bowl. Ring 2 will not be subjected to stress by this load. Ring 2 will rather have to absorb merely the outer loads acting in its plane.

The struts 9 may also be viewed as edges of a supporting pyramid, and it is possible instead of a cone-shaped bowl to provide a pyramid-shaped bowl in conformity with Fig. 11. If desired, the marginal ring may, instead of being circular, have a corresponding polygonal shape. The bowls of revolution may be arranged at different levels and with different diameters. If the bowls have a rather great diameter and a low axial height, the supporting members 3, 4 as well as 14 will under certain circumstances become short stumps as shown in Figs. 8 and 9, or each of the two supporting groups 3, 4, 14 will be replaced by a single foundation (Figs. 10 and 11). In conformity with the arrangement of Fig. 21, it is also possible to omit the supporting members 3, 4 if the supporting members 14 together with struts 9 arranged along the extensions of said supporting members 14 form bend-resistant supporting elements. The struts 9 and supporting members 3, 4 and 14 may, if desired also partially only be connected to each other by discs or rods in order to reduce the unsupported length over which buckling may occur. As has been mentioned above, instead of bowls of revolutions, also any other type of bowls having large areas open to attack by the wind and provided with an endless supporting member may primarily in the same manner be supported as has been described above in connection with reflectors.

Figure 6:
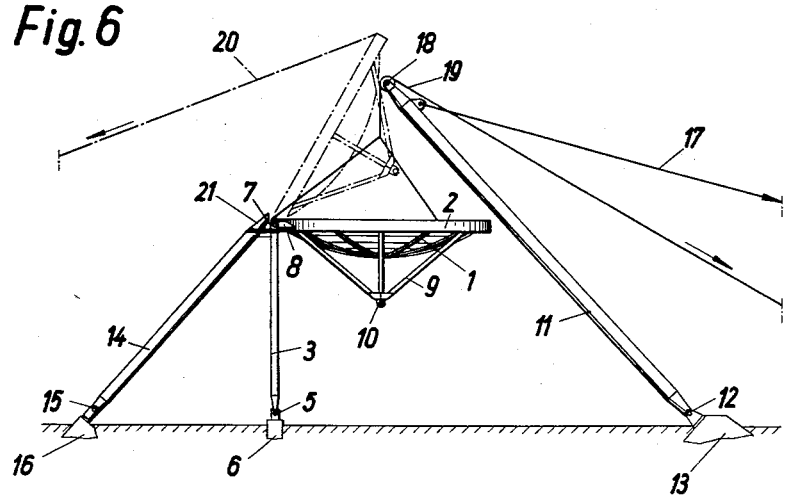
Figs. 6 and 7 show views of a reflector and the support in different positions during the installation of said reflector.
Figure 7:
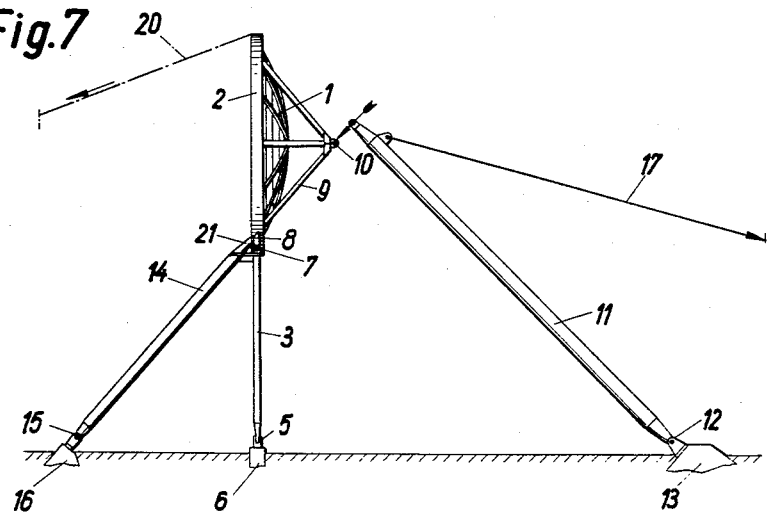

The invention brings about the further advantage that the assembly of the reflector or the like will be highly favorable. As will be evident from Fig. 6, the rear support 11 of the tripod may be employed as lever or jack inasmuch as it will be supported by a rope or cable 17 and carries at the tip thereof a deviating roller 18 over which passes a tackle 19 for lifting the marginal ring 2 with the reflector 1 and the struts 9. In the position shown in Fig. 6, the marginal ring 2 has in horizontal position been lifted to such an extent that the extensions 8 may be connected to the joints 7 of the already mounted supports 3, 4 while also the inclined supports 14 have already been mounted and together with the supporting elements 3, 4 form further triangular blocks. If thus marginal ring 2 has been tilted upwardly, for instance into the dot-dash line position by means of the tackle 19, it is by means of a rope 20 directly from the ground lifted into its final position shown in Fig. 7. The marginal ring 2 will abut abutments 21 at the upper end of the inclined supports 14 whereby the tilting of the marginal ring beyond the vertical position will be prevented. Thereupon, after the roller 18 together with the tackle 19 has been removed, the support 11 is tilted downwardly to such an extent that its upper end may be pivotally connected with the nodal point 10 of the struts 9.

If required, especially if the support 11 is particularly long, an auxiliary mast or post may be employed for lifting and lowering the support 11.

With the embodiment according to Figs. 12 and 13, the reflector 1 having the shape of a bowl of revolution is surrounded and engaged all the way around by a marginal ring 2. At the circumference of the marginal ring 2 there are arranged at the same level two joints 23 acted upon by two vertical tangential supports 24 which, by means of joints 25, rest on two foundations 26. At the lower side of the marginal ring there is arranged in the vertical meridian plane of bowl 1, an extension 27 which engages a stationary bearing 28 in such a way that extension 27 will convey upon said bearing such forces which act exclusively tangentially to the marginal ring 2 toward one or the other side. Vertical forces or forces perpendicular to the marginal plane will thus not be absorbed by the bearing 28.

Figure 20:
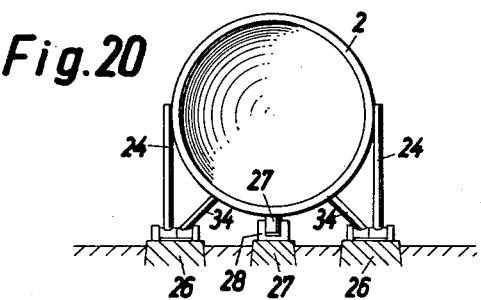

The bearing 28 is supported by the foundations 26 through the intervention of two struts 29. If the bowl of revolution has a very great diameter while the tangential supporting means are not much longer than the diameter of the bowl, the bearing 28 is preferably fixedly connected directly to a foundation (Fig. 20).

Connected to the rear side of the marginal ring 2 are struts 30 (Figs. 12 and 13) which are uniformly distributed over the circumference of ring 2 and converge in a nodal point 31 located on the axis of the bowl 1. The nodal point 31 forms the tip of a tripod having one leg 32 thereof located in the vertical meridian plane of bowl 1 and pivotally supported on foundation 33. The two other legs 34 of said tripod extend from said nodal point 31 to the foundations 26 where they are pivotally anchored near the joints 25 of the tangential supporting members 24.

The weights of the reflector 1 and of the marginal ring 2 with the struts 30 as well as other possible vertical loads such as load due to ice formation will be absorbed by the tangential supports 24 as far as these loads act in the plane of the marginal ring 2. As far as the resultant of these loads is located outside said ring plane, it will be balanced by the tripod 32, 34, 34. The tangential rods 24 will also absorb the torques acting in the plane of the marginal ring 2, whereas the bearing 28 will absorb merely the forces which act in horizontal direction parallel to the plane of the marginal ring.

Figure 14:
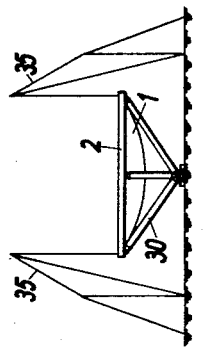
Figure 15:
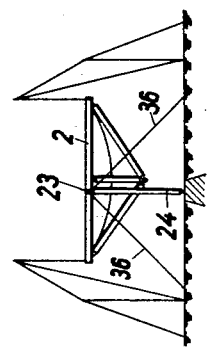
Figure 16:
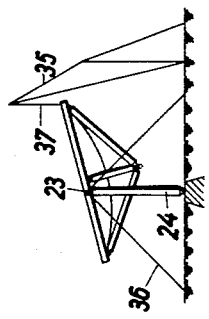
Figure 17:
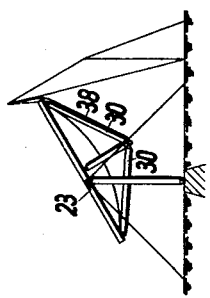
Figure 18:
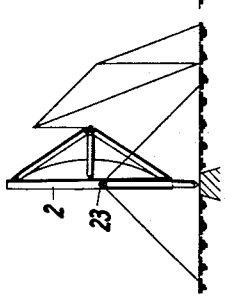
Figure 19:
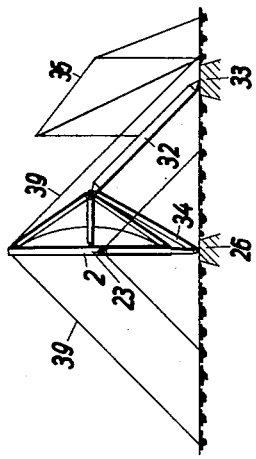

The installation of a reflector with the supporting structure described above will be effected in the following manner:

According to Fig. 14, the bowl or reflector 1 with the struts 30 connected to the marginal ring 2 will, by means of two lifting devices 35, be held in the illustrated position in which the plane of the marginal ring 2 is located horizontally and in which the struts 30 extend from the marginal ring downwardly so that the reflector or bowl 1 is open toward the top. According to Fig. 15 the reflector is then lifted to such an extent that the tangential supports 24 which are held in their final position by wires 36 extending in all directions, will be able to have their upper ends connected to the joints 23 on marginal ring 2. Thereupon, the reflector is tilted in the joints 23 by means of a lifting device 35 in conformity with Figs. 16 and 17. To this end, when the lifting rope 37 has been pulled in as far as possible, according to Fig. 17 a new lifting rope 38 is connected to the point at which the struts 30 converge. According to Fig. 18, the reflector has reached its final position in which the plane of the marginal ring is located in a vertical plane. In this location, the reflector is first held by tensioning wires 39 and then by means of the lifting device 35, the three legs 32, 34, 34 of the tripod are connected (Fig. 19). Furthermore, the bearing 28 is mounted on a separate fundation 29 below the lowermost point of the marginal ring 2 as shown in Fig. 20.

It is, of course, to be understood that the present invention is, by no means, limited to the particular constructions shown in the drawings, but also comprises any modifications within the scope of the appended claims.

What I claim is:

1. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and means supporting said supporting structure at at least three points one of which is formed by said nodal point.

2. A support system according to claim 1, in which said endless support is connected to said large area body at the circumference thereof.

3. In a support system comprising a large area body and an endless support connected thereto: pressure and pull-resistant struts having one end thereof connected to substantially uniformly distributed points of said endless support and having their other ends converge into a nodal point located within the maximum projection of said body, said endless support and said struts forming with each other a supporting structure, the distance of said nodal point from said body being less than the maximum dimension of the latter, and means supporting said supporting structure at at least three points one of which is formed by said nodal point.

4. In a support system comprising a large area body and an endless support connected thereto: pressure and pull-resistant supporting means forming a single cone-shaped bowl connected to said endless support and having the apex of said cone-shaped bowl located within the maximum projection of said body, said endless support and said cone-shaped bowl forming with each other a supporting structure, the distance of said apex from said body being less than the maximum dimension of the latter, and means supporting said supporting structure at at least three points one of which is formed by said apex.

5. In a support system comprising a large area body and an endless support connected thereto: pressure and pull-resistant supporting means forming a single pyramidal bowl connected to said endless support and having the apex of said pyramidal bowl located within the maximum projection of said body, said endless support and said pyramidal bowl forming with each other a supporting structure, the distance of said apex from said body being less than the maximum dimension of the latter, and means supporting said supporting structure at at least three points one of which is formed by said apex.

6. In a support system comprising a bowl-shaped large area body and an endless support connected thereto: pressure and pull resistant supporting elements having one end thereof connected to spaced portions of said endless support and having their other end converge into a nodal point located within the maximum projection of said body, said supporting elements being at least within the range of their respective connecting points with said endless support tangential to said bowl-shaped body, said endless support and said supporting elements forming with each other a supporting structure, the distance of said nodal point from said body being less than the maximum dimension of the latter, and means supporting said supporting structure at at least three points one of which is formed by said nodal point.

7. In a support system comprising a large area body and an endless support connected thereto: pressure and pull resistant supporting elements having one end connected to spaced portions of said endless support and having their other ends converge into a nodal point located within the maximum projection of said body, said body being so supported that the forces acting at the supporting points therefor act eccentrically with regard to the connecting line of the shear centers of said endless support, the supporting forces conveyed through said supporting elements acting eccentrically with regard to said connecting line so that the torques exerted by said last mentioned forces upon said endless support at least nearly balance each other, said endless support and said supporting elements forming with each other a supporting structure, the distance of said nodal point from said body being less than the maximum dimension of the latter, and means supporting said supporting structure at at least three points one of which is formed by said nodal point.

8. In a support system comprising a bowl-shaped large area body: an endless support connected to the convex side of said body, pressure and pull resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and means supporting said supporting structure at at least three points one of which is formed by said nodal point.

9. In a support system comprising a large area body: a support having a triangular cross section and connected along a surface thereof with said body, pressure and pull-resistant supporting elements having one end thereof connected to spaced portions of said support and having their other ends converge into a nodal point located within the maximum projection of said body, said endless support and said supporting elements being connected to the inner edge of said support, said endless support and said supporting elements forming with each other a supporting structure, the distance of said nodal point from said body being less than the maximum dimension of the latter, and means supporting said supporting structure at at least three points one of which is formed by said nodal point.

10. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and a tripod structure supporting said supporting structure at at least three points one of which is formed by said nodal point, said nodal point simultaneously forming the nodal point of said tripod structure.

11. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and a tripod structure supporting said supporting structure at at least three points one of which is formed by said nodal point, said nodal point simultaneously forming the nodal point of said tripod structure, and some of said supporting elements forming part of two legs of said tripod structure.

12. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and a tripod structure supporting said supporting structure at at least three points one of which is formed by said nodal point, said nodal point simultaneously forming the nodal point of said tripod structure, and some of said supporting elements forming part of two legs of said tripod structure, said two legs in addition to said nodal point comprising two further supporting points for said supporting structure.

13. A support system according to claim 12, which includes legs connected to at least some of said further supporting points for said supporting structure, said last mentioned legs extending in the plane of said supporting structure.

14. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and means including leg members connected to said endless support and supporting said supporting structure at at least three points one of which is formed by said nodal point, the axes of two legs connected to spaced points of said endless support intersecting substantially in the vertical plane of symmetry of said large area body.

15. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and means including leg members connected to said endless support and supporting said supporting structure at at least three points one of which is formed by said nodal point, the axes of two legs connected to spaced points of said endless support intersecting substantially at the line of intersection of the vertical plane of symmetry of said large area body with the horizontal plane of symmetry of said large area body.

16. In a support system comprising a large area body and an endless support connected thereto: pressure and pull-resistant struts having one end thereof connected to substantially uniformly distributed points of said endless support and having their other ends converge into a nodal point located within the maximum projection of said body, said endless support and said struts forming with each other a supporting structure, the distance of said nodal point from said body being less than the maximum dimension of the latter, supporting means supporting said supporting structure at at least three points one of which is formed by said nodal point, and groups of tripods connected to additional supporting points of said supporting structure.

17. A support system according to claim 12, in which the further supporting points are located directly on foundation means.

18. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and a tripod structure having two legs respectively aligned with and connected to two of said supporting elements, said tripod structure including a third leg pivotally connected to said nodal point and operable as jack during the installation of said body.

19. In a support system comprising a large area body and an endless support connected thereto: pressure and pull-resistant struts having one end thereof connected to substantially uniformly distributed points of said endless support and having their other ends converge into a nodal point located within the maximum projection of said body, said endless support and said struts forming with each other a supporting structure, the distance of said nodal point from said body being less than the maximum dimension of the latter, supporting means supporting said supporting structure at at least three points one of which is formed by said nodal point, and groups of tripods connected to additional supporting points of said supporting structure, two of said additional supporting points being designed as detachable joints with the same axis and being adapted to allow suspending and upward tilting of said body during the installation thereof.

20. A support system according to claim 19, which includes abutment means adjacent said joints for preventing a tilting of said body about its intended final position.

21. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, and means supporting said supporting structure at at least three points one of which is formed by said nodal point, said means including two vertical supporting members substantially tangential to said endless support and pivotally connected to diametrically oppositely located points of said endless support for absorbing the vertical forces in the plane of said endless support and the torques produced thereby, said supporting means also including bearing means engaging the circumference of said endless support for absorbing forces acting in horizontal direction within the plane of said endless support.

22. A support system according to claim 19, in which said bearing means is arranged at the lower side of said endless support in the vertical meridian plane thereof.

23. In a support system comprising a large area body and an endless support connected thereto: pressure and pull-resistant supporting elements having one end thereof connected to spaced portions of said endless support and having their other ends converge into a nodal point located within the maximum projection of said body, said endless support and said supporting elements forming with each other a supporting structure, the distance of said nodal point from said body being less than the maximum dimension of the latter, means supporting said supporting structure at at least three points one of which is formed by said nodal point, said means including two vertical supporting members substantially tangential to said endless support and pivotally connected to diametrically oppositely located points of said endless support for absorbing the vertical forces in the plane of said endless support and the torques produced thereby, said supporting means also including bearing means engaging the circumference of said endless support for absorbing forces acting in horizontal direction within the plane of said endless support, a pair of additional supporting members supporting said bearing means, and foundation means supporting said additional supporting members and also supporting said two vertical supporting members.

24. A support system according to claim 21, in which the nodal point is formed by the tip of a tripod, and foundation means having the lower ends of two legs of said tripod and the lower ends of said vertical supporting members anchored therein.

References Cited in the file of this patent
UNITED STATES PATENTS

| | | |
|---|---|---|
| 2,572,430 | Balton | Oct. 23, 1951 |
| 2,850,735 | Harris | Sept. 2, 1958 |

OTHER REFERENCES

Science News Letter, Jan. 18, 1958.